(No Model.)

B. A. GILBERT.
BRIDGE SPRING FOR EYEGLASSES OR SPECTACLES.

No. 527,745. Patented Oct. 16, 1894.

WITNESSES:
V. E. Page
James Loughran.

Benj. A. Gilbert
INVENTOR
By his attorneys
Strawbridge & Taylor

UNITED STATES PATENT OFFICE.

BENJAMIN A. GILBERT, OF BOSTON, MASSACHUSETTS, ASSIGNOR TO HENRY E. KIRSTEIN, OF ROCHESTER, NEW YORK.

BRIDGE-SPRING FOR EYEGLASSES OR SPECTACLES.

SPECIFICATION forming part of Letters Patent No. 527,745, dated October 16, 1894.

Application filed August 2, 1893. Serial No. 482,140. (No model.)

*To all whom it may concern:*

Be it known that I, BENJAMIN A. GILBERT, a citizen of the United States, residing in the city of Boston and State of Massachusetts, have invented an Improvement in Bridge-Springs for Eyeglasses or Spectacles, of which the following is a specification.

My invention relates to bridge springs employed upon eye glasses and spectacles, and especially, although not restrictively, to the class of bridge springs known as bar springs, in which the extremital portions or side pieces of the structure are connected in such manner as to have a horizontal sliding movement toward and from each other, and which are constantly pressed toward each other, or, in other words, given a contractile tendency, by a spiral or other spring mounted upon the structure at such point as convenience of manufacture or the requirements of the art may dictate.

In the use of eye glasses which are retained in place upon the nose of the wearer by the clasping action due to the contractile tendency of the bridge spring, it has been found that the clasp of the nose pieces is in some cases stronger than is necessary to hold the glasses in place and such as to be uncomfortable to the wearer.

It is the object of my invention to provide a bridge spring with means by which the extent of its closing action and therefore the degree of strength of its clasp upon the nose of the wearer, may be limited, and, furthermore, to provide such means for accomplishing the foregoing purpose as shall be adjustable so as to be readily set to any desired position with reference to the dimensions of the wearer's nose.

Figure 1:
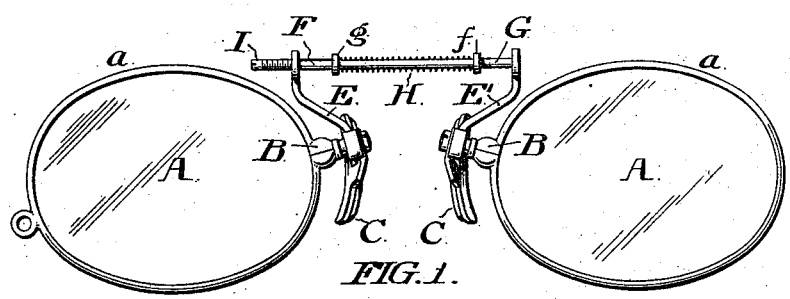
Figure 2:
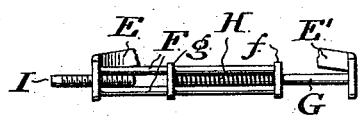
Figure 3:
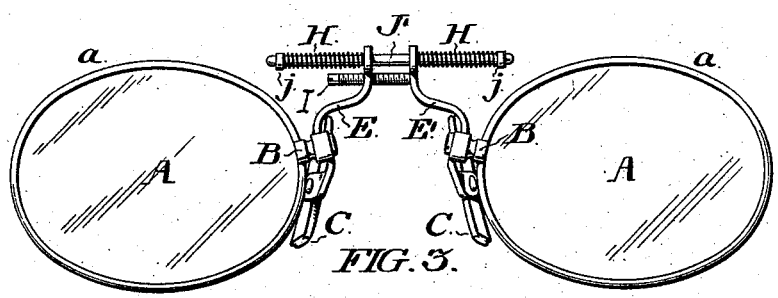
Figure 4:
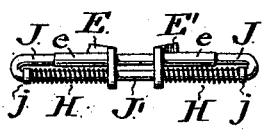

In the drawings, Figure 1 is a view in front elevation of a pair of eye-glasses equipped with a good form of my invention. Fig. 2 is a top plan view of the bridge spring of Fig. 1. Fig. 3 is a view in front elevation of a pair of eye glasses provided with a bridge spring differing in construction from that shown in Figs. 1 and 2 and illustrating a different application of my invention. Fig. 4 is a top plan view of the bridge spring of Fig. 3.

Referring to the accompanying drawings, A A are the lenses; a, the lens rims; B, the clamp posts; C C, the nose pieces, and E E', the side bars of the bridge springs of glasses in connection with which two of the many possible embodiments of my invention are illustrated as employed.

Referring to Figs. 1 and 2, which illustrate one of the many forms of bridge spring in connection with which my invention may be employed, F F are a pair of slide pins horizontally projecting, in parallelism, from the side bar E, and the free extremities of which are equipped with a yoke $f$.

G is a slide pin horizontally projecting from the side bar E', passing through the yoke $f$, so that its outer portion exists between the pins F F, and equipped at its free extremity with a yoke $g$ which embraces the slide pins F F.

H is a spiral spring mounted upon the slide pin G, and bearing as to its respective extremities respectively against the yokes $f$ and $g$, the action of which spring is to force the yokes $f$ $g$ away from each other and consequently to draw the lenses and nose pieces toward each other.

The construction of bridge spring so far described is well known in the art and constitutes a form which I have selected as an appropriate one in connection with which to illustrate a selected typical embodiment of my invention.

Normally the action of the spring H is such as to force the yokes $f$ $g$ away from each other and into contact with the side bars E' E and therefore to force the nose pieces toward and almost or quite into contact with each other.

In order to limit the approach of the lenses, and prevent excessive pressure of the bridge spring upon the nose of the wearer, I provide means to limit the closing action of the bridge spring. The means employed to accomplish this purpose may be varied indefinitely in character, position, and relationship to the parts of the bridge spring in connection with which they are employed.

In Figs. 1 and 2 of the drawings such means are shown as consisting of a screw shaft, I, mounted in parallelism with and partly between the slide pins F F, in a suitably threaded aperture in the upper portion of the side bar E. This screw shaft I will, as will be understood, be encountered by and serve to stop the yoke $g$ as the latter is by the spiral spring H forced away from the yoke $f$, and, in thus limiting the separation of the yokes will limit the approach of the nose pieces through which the bridge spring clasps the nose of the wearer.

As will be understood, the screw shaft I may by suitable rotation be advanced or withdrawn so as to fix at any desired point the limit of the approach of the nose pieces.

In the form of bridge spring shown in Figs. 3 and 4, two slide pins J J' are illustrated as employed, said slide pins being shown as merged into each other at their respective extremities so as to constitute a single continuous structure. The upper extremities of the respective side bars E E' embrace both slide pins, and, preferably, smoothness of sliding action of the side bars is secured by providing the latter each with an extended tubular collar $e$, each of which collars encircles, and with its side bar is adapted to slide upon, the slide pin J.

H H are spiral springs mounted respectively upon the respective extremities of the slide pin J', each, at its outer end, adapted to bear against one of a pair of collars $j$ permanently mounted upon the respective extremities of the slide pin J',—and each, at its inner extremity, bearing against the adjacent side bar. The tendency of the springs H is of course, to force the side bars and therefore the nose pieces toward each other.

In the form of bridge spring last described, I show, as a means to limit the closing action of the bridge spring and the approach of the nose pieces, a screw shaft I mounted in a suitably threaded aperture so located in the side bar E, that the advance end of the screw projects into a position in which it is encountered by the side bar E' when the latter under the stress of the springs H H is forced toward the side bar E.

Having thus described my invention, I claim—

1. As an article of manufacture, a bridge spring provided with an adjustable stop to prevent the approach of the lenses beyond a selected point, substantially as set forth.

2. As an article of manufacture, a bridge spring the extremities of which are adapted to approach each other, a stop device mounted upon, and in threaded relationship with respect to, one part of the bridge spring, and in position to be encountered by another part of the bridge spring in the closing movement of said bridge spring, substantially as set forth.

3. The combination, in a bridge spring, of side bars, slide pins, yokes, a spring, and a screw shaft mounted in a threaded aperture in one of the side bars in position to be encountered by a movable part of the bridge spring, substantially as set forth.

In testimony that I claim the foregoing as my invention I have hereunto signed my name this 6th day of July, A. D. 1893.

BENJ. A. GILBERT.

In presence of—
WM. C. ADAMS,
H. L. CARPENTER.